United States Patent
Matthews et al.

(10) Patent No.: US 8,867,353 B2
(45) Date of Patent: Oct. 21, 2014

(54) SYSTEM AND METHOD FOR ACHIEVING LOSSLESS PACKET DELIVERY IN PACKET RATE OVERSUBSCRIBED SYSTEMS

(75) Inventors: Brad Matthews, San Jose, CA (US); Bruce Kwan, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 369 days.

(21) Appl. No.: 13/174,582

(22) Filed: Jun. 30, 2011

(65) Prior Publication Data
US 2013/0003546 A1  Jan. 3, 2013

(51) Int. Cl.
*H04L 12/26* (2006.01)
*H04L 12/931* (2013.01)
*H04L 12/825* (2013.01)
*H04L 12/801* (2013.01)

(52) U.S. Cl.
CPC .......... *H04L 43/0894* (2013.01); *H04L 49/50* (2013.01); *H04L 47/263* (2013.01); *H04L 47/12* (2013.01); *Y02B 60/31* (2013.01)
USPC ........................................................ 370/231

(58) Field of Classification Search
CPC ... H04L 1/0002; H04L 43/0894; H04L 43/50; H04L 12/40136; H04L 12/0262; H04L 47/263; H04L 47/10; H04L 47/11; H04L 47/12; H04L 65/80; H04W 28/22; H04Q 11/045; H04Q 2213/13204
See application file for complete search history.

(56) References Cited

U.S. PATENT DOCUMENTS

| | | | |
|---|---|---|---|
| 5,812,527 A * | 9/1998 | Kline et al. | 370/232 |
| 2003/0021230 A1 * | 1/2003 | Kuo et al. | 370/230 |
| 2006/0072722 A1 * | 4/2006 | Savoor et al. | 379/93.05 |
| 2008/0291927 A1 * | 11/2008 | Yong et al. | 370/400 |
| 2008/0298397 A1 * | 12/2008 | Kwan et al. | 370/477 |
| 2009/0003209 A1 * | 1/2009 | Kalkunte et al. | 370/232 |

* cited by examiner

*Primary Examiner* — Yong Zhou
(74) *Attorney, Agent, or Firm* — Duane S. Kobayashi

(57) ABSTRACT

A system and method for achieving lossless packet delivery in packet rate oversubscribed systems. Link-level packet rate control can be effected through the transmission of packet rate control messages to link partners of an oversubscribed system. The transmission of packet rate control messages can be triggered upon a determination that a packet arrival rate over a set of ingress ports exceeds a packet processing rate of a packet processing unit bound to the set of ingress ports. In one embodiment, the packet processing rate is artificially reduced due to a reduction in power consumption in the oversubscribed system.

14 Claims, 4 Drawing Sheets

SYSTEM AND METHOD FOR ACHIEVING LOSSLESS PACKET DELIVERY IN PACKET RATE OVERSUBSCRIBED SYSTEMS

BACKGROUND

1. Field of the Invention

The present invention relates generally to network switches and, more particularly, to a system and method for achieving lossless packet delivery in packet rate oversubscribed systems.

2. Introduction

Increasing demands are being placed upon the data communications infrastructure. These increasing demands are driven by various factors, including the increasing bandwidth requirements of multimedia traffic. To accommodate the increasing bandwidth requirements, communication link speeds have also continued to evolve. For example, 10 Gigabit Ethernet (GbE) ports are commonly used for I/O on many of today's network switches.

One of the problems introduced by the increasing I/O bandwidth exemplified by the 10 GbE port is the potential for an oversubscribed switch. In general, an oversubscribed condition for a switch can occur when the combined I/O bandwidth across a set of ports exceeds the core bandwidth of the switch. Some of today's switches have designed configurations that have the potential for entering into an oversubscribed condition. This results from the need for significant I/O bandwidth for a port, faster time to market, and a low likelihood that all of the I/O ports will receive traffic at the highest capacity at the same time.

When a switch enters into an oversubscribed condition where the packet arrival rate exceeds the packet processing rate, oversubscription buffers limits can be exceeded. When the oversubscription buffer limits are exceeded, the oversubscription buffer backs up and packet loss can occur. It should be noted that an oversubscribed switch may continue to support the line rate as long as the average packet size for a specified period of time exceeds a predefined packet size. For example, if the average packet size is greater than 150 bytes for all periods of time greater than one second, then packet loss will not occur.

For some classes of traffic, packet loss can produce little to no impact on network services and applications. In datacenter applications, however, packet loss can be unacceptable. What is needed therefore is a mechanism that achieves lossless packet delivery in packet rate oversubscribed systems.

SUMMARY

A system and/or method for achieving lossless packet delivery in packet rate oversubscribed systems, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

As noted, many of today's switches have designed configurations that have the potential for entering into an oversubscribed condition. This is a result of high bandwidth I/O ports (e.g., 10 GbE) that in combination can exceed the packet processing capabilities of the switch.

Figure 1:
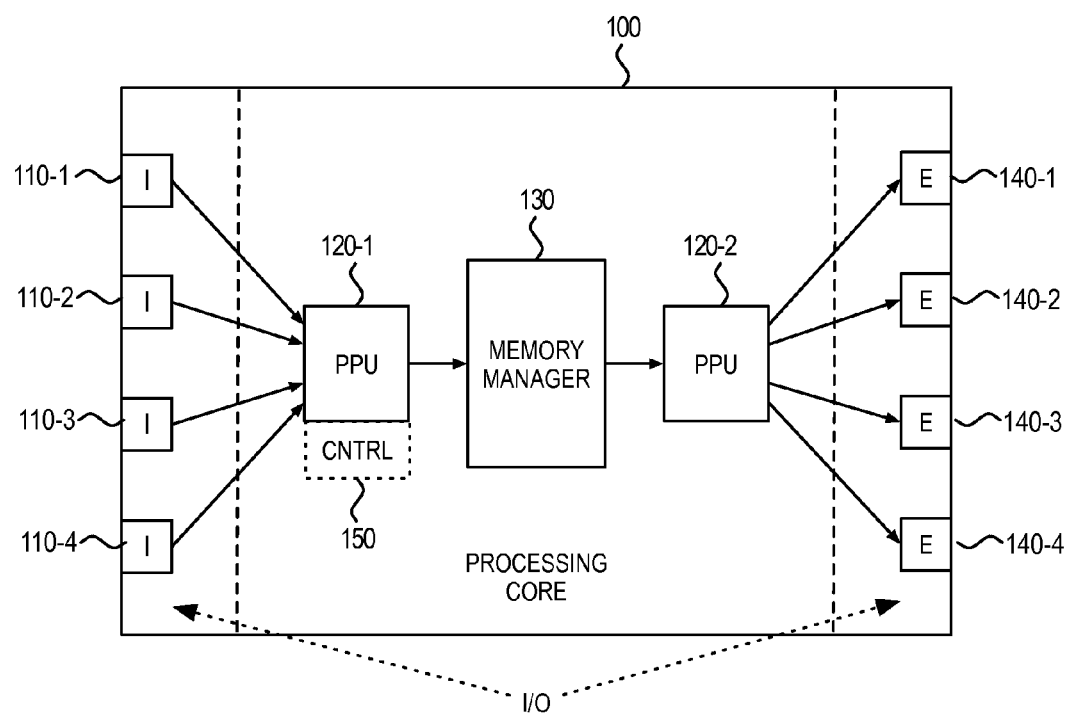
FIG. 1 illustrates an example embodiment of a general switch.

FIG. 1 illustrates an example embodiment of a switch. As illustrated, switch 100 includes a plurality of ingress ports 110-1 to 110-4, each of which can provide connectivity to other network devices. As an example, each of ingress ports 110-1 to 110-4 can provide 10 GbE connectivity to other switches in a data center. Similarly, switch 100 includes a plurality of egress ports 140-1 to 140-4, each of which can provide connectivity to other network devices.

As illustrated, ingress ports 110-1 to 110-4 and egress ports 140-1 to 140-4 are included as part of the I/O portion of switch 100. The I/O portion of switch 100 is shown as being logically distinct from the processing core of switch 100. This logical distinction is provided to distinguish between the packet arrival rate and the packet processing rate of switch 100.

As illustrated, the processing core of switch 100 includes packet processing units 120-1, 120-2 and memory manager 130. In one embodiment, packet processing units 120-1, 120-2 execute real-time operations on packets, such as framing/parsing, classification, traffic policing and shaping, modification, compression/encryption, queueing, etc. Control operations such as translation, route calculation, routing table updates, etc. can also be performed by packet processing units 120-1, 120-2.

As would be appreciated, the specific configuration of the processing core of the switch is implementation dependent. For example, in another embodiment, the processing core can be based on memory managers that are connected via a crossbar switch.

Here, it should be noted again that the high-level block diagram of FIG. 1 is intended to illustrate a logical distinction between the I/O and processing core sections of switch 100. In an actual physical implementation, for example, switch 100 can be a chassis-based system that includes line cards and switch cards. Here, the particular demarcation that defines the boundary of the packet processing unit would be implementation dependent. In the context of the present invention, the packet processing unit can represent any element in the switch that has a limited packet processing rate relative to a packet arrival rate of one or more interface elements.

As noted, many of today's switches are configured with I/O ports that have a combined maximum arrival rate that can exceed a processing rate of a processing core element. While this oversubscription condition can occur infrequently, identification of such a condition is a significant factor in eliminating packet loss.

Although not shown in FIG. 1, each ingress port 110-1 to 110-4 can have an associated oversubscription buffer that can accommodate temporary oversubscription for that ingress port. While the size of the oversubscription buffers can vary, the oversubscription buffers are typically designed to accommodate typical "bursty" traffic conditions, not the more extreme conditions represented by traffic examples such as tail latency. Conventionally, a back up of an oversubscription buffer will result in packet loss.

As would be appreciated, simply increasing the size of the oversubscription buffers is not practical due to the poor cost/benefit considerations of such a solution. In contrast, it is a feature of the present invention that an oversubscription condition in a switch is addressed through a reduction in the packet arrival rate at the switch. In one embodiment, the packet arrival rate at the switch is reduced through link-level packet rate control.

Figure 2:
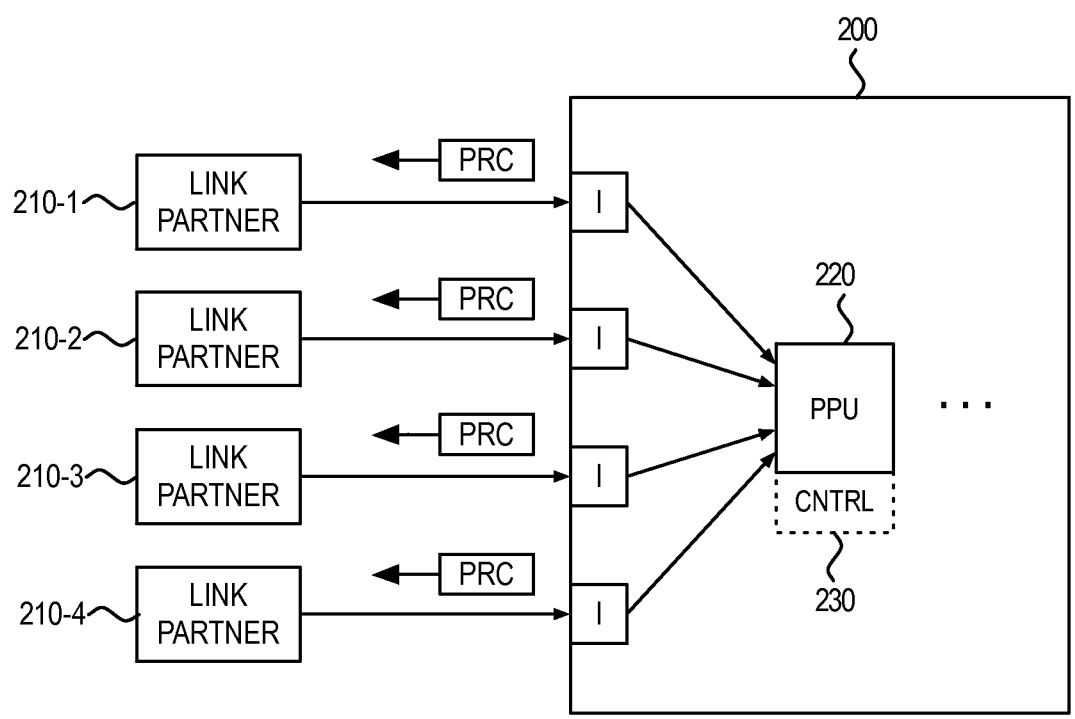
FIG. 2 illustrates an example of transmission of packet rate control messaging from a switch.

FIG. 2 illustrates an example of link-level packet rate control of the present invention. As illustrated, switch 200 includes a plurality of ingress ports that are each coupled to packet processing unit 220. In this example, assume that each of the plurality of ingress ports has the capacity to receive packets transmitted by link partner 210-1 to 210-4 at a rate of 50 Mpps, while packet processing unit 220 can process packets at a rate of 100 Mpps. In this example, the total packet arrival rate of the four ingress ports would be 200 Mpps, which is greater than the 100 Mpps of the packet processing unit. Here, it should be noted that the packet per second (pps) numbers would be dependent on various factors such as the size of the packets (e.g., 64, 200, 1000, etc. bytes), the inter-packet gap (IPG), and overhead.

In those instances where the packet arrival rate from link partners 210-1 to 210-4 exceeds the packet processing rate of packet processing unit 220, an oversubscription condition would occur. In the present invention, the oversubscription condition is addressed by link-level packet rate control. In the embodiment illustrated in FIG. 2, this link-level packet rate control is effected by the transmission of packet rate control (PRC) messages to all link partners 210-1 to 210-4 that are bound to a processing rate limited packet processing unit. In general, each PRC message is designed to indicate to its link partner that it should reduce its packet transmission rate from a selected port. In one embodiment, the PRC message can be used to signal a port shaper element in one of link partners 210-1 to 210-4 to reduce its allocated packet rate. In another embodiment, a scheduler may elect not to schedule a port, select queues or reduce the rate at which it makes scheduling decisions to reduce its output rate below a target amount. The reduction of the packet transmission rate by link partners 210-1 to 210-4 serves to reduce the packet arrival rate to that which can be accommodated by the processing core of switch 200. In various embodiments, the PRC messages can be transmitted using in-band or out-of-band signaling.

In one embodiment, the PRC message enables an identification of a packet rate limit for the port and a time duration for such a restriction on the packet transmission rate. The time duration for the restriction can represent a fixed default value, or can represent a variable amount of time that is determined based on the characteristics of the oversubscription condition. As would be appreciated, the PRC message can identify a packet rate limit and/or a time duration for a rate restriction either directly or indirectly. In one example, the receipt of the PRC message itself is sufficient for a link partner to identify a default packet rate limit and time duration.

In one embodiment, the packet rate limit is identified as the packet processing rate divided by the number of ports. In the example of FIG. 2, the packet rate limit can be established as 100 Mpps/4 ports=25 Mpps for each ingress port. This would provide each ingress port with a fair share of the available packet processing rate of packet processing unit 220. In another embodiment, the packet rate limit can be individually identified for each ingress port. In this embodiment, the individual packet rate limits can be based on port priority values that enable a prioritized distribution of the available packet processing rate of packet processing unit 220. As would be appreciated, the specific mechanism for distributing the packet processing rate would be implementation dependent.

Should a prioritized or other unbalanced mechanism for rate control be implemented across the link partners, PRC messages may not need to be transmitted to all link partners. This can be the case, for example, where a reduction to the packet transmission rate is determined to apply to only a subset of the link partners. In one embodiment, the policy may be such that only the top talkers (i.e., link partners having the highest transmission rate) are sent a PRC message.

The triggering of the transmission of the PRC messages can be based on a variety of mechanisms. In general, it is recognized that the triggering of the transmission of the PRC message is based on an identification of a oversubscription condition that can lead to packet loss. In one example, the triggering is based on an examination of fill levels of oversubscription buffers (not shown) that are associated with an ingress port. In this simple process, control module 230 associated with packet processing unit 220 would be responsible for analyzing the fill levels of the oversubscription buffers associated with the ingress ports to determine whether a fill level threshold value has been exceeded. Should such a fill level threshold value be exceeded in one or more oversubscription buffers, control module 230 could then trigger the transmission of PRC messages.

In another example, control module 230 can be designed to monitor the ratio of arrival rate to processing rate. If the arrival rate is determined to be approaching the processing rate, control module could then trigger the issuance of PRC messages to link partners 210-1 to 210-4. For example, if the max packet processing rate is 50 Mpps, then control module 230 can trigger the issuance of PRC messages when the packet arrival rate is greater than or equal to 40 Mpps. As would be appreciated, the specific mechanism for measuring the arrival rate relative to the processing rate would be implementation dependent. In another example, control module 230 can issue PRC messages based on other metrics such as device or system temperature measurements, observed device or system power, time of day, or other system attributes.

Figure 3:
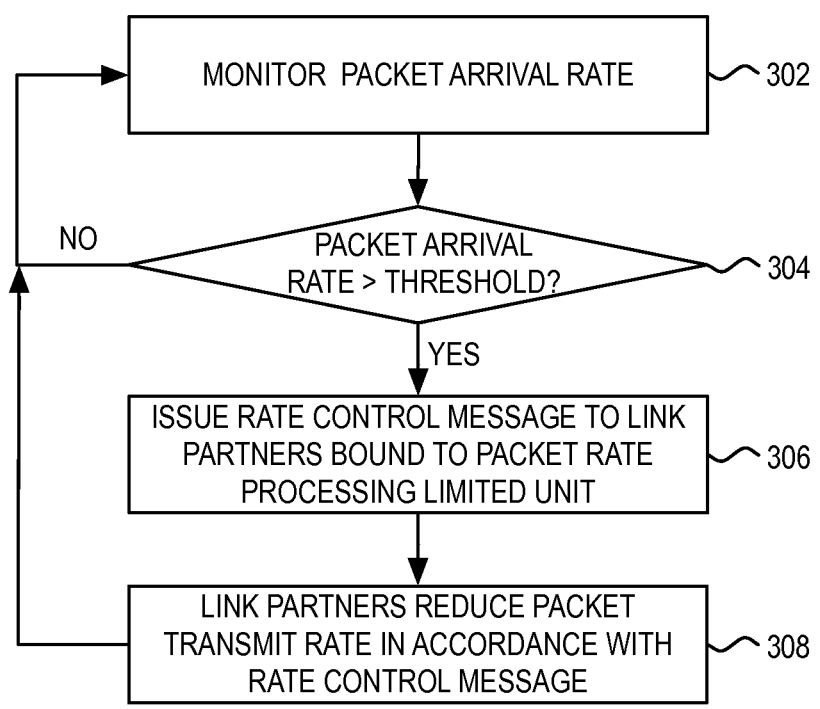
FIG. 3 illustrates a flowchart of a process of the present invention.

Having described a link-level rate control mechanism in a switch, the general principles of the present invention are now described with reference to the example flow chart of FIG. 3. As illustrated, the process of FIG. 3 begins at step 302 where a packet arrival rate is monitored. As it is assumed that the switch is designed with an oversubscribed configuration, the packet arrival rate can exceed the packet processing rate at certain points of time.

At step 304, the packet arrival rate is then analyzed relative to a threshold value. In various examples, this threshold value can be independent of the packet processing rate (e.g., oversubscription buffer fill level) or can be related to an actual or estimated packet processing rate.

If it is determined at step 304 that the packet arrival rate is lower than the threshold, then an oversubscribed condition has not occurred (or is not imminent) and monitoring of the packet arrival will continue at step 302 without further action. If, on the other hand, it is determined at step 304 that the packet arrival rate has exceeded the threshold, then PRC message(s) are issued to link partners that are bound to the packet rate processing limited unit.

Upon receipt of the PRC messages, the link partners then proceed at step 308 to reduce their packet transmit rate in accordance with the rate control message. As noted, the packet transmit rates can be limited uniformly or adjusted in accordance with an unbalanced priority scheme.

In the present invention, it is recognized that the above process provides a link-level control that can be effected by a switch based on an analysis of its own traffic arrival and processing rates. This mechanism enables a measure of distributed control throughout the network in ensuring that lossless packet delivery is achieved within the network.

Figure 4:
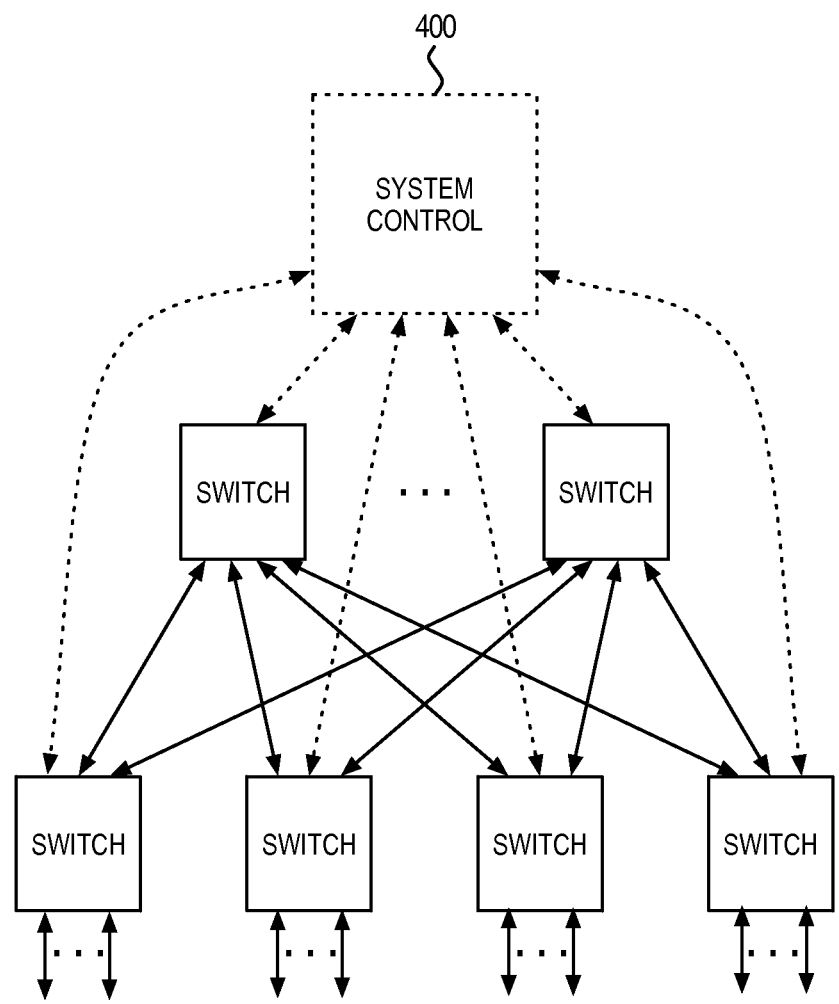
FIG. 4 illustrates an example application context of the principles of the present invention.

More generally, it is recognized that control and delivery of PRC messages can be effected in a centralized manner. FIG. 4 illustrates an example of an embodiment that effects centralized control of link-level transmission rates. As illustrated, a plurality of switches are each coupled to system control 400. System control 400 can be designed to monitor packet receiving rates relative to packet processing rates in a switch. An identification of an oversubscribed condition can then trigger a transmission of PRC messages to the switches that are coupled to the oversubscribed switch. Link-level rate control can then be effected in a manner similar to above.

In one embodiment, the packet processing rate limitation in a particular switch can be an artificial limitation. For example, assume that it is desired to reduce a power consumption of a particular switch for a particular time period. This reduction in power consumption can be effected through a reduction in packet processing rate of a switch, which reduction in packet processing rate can then necessitate a reduction in a packet arrival rate on the ingress ports. As would be appreciated, the impetus for a reduction in power can be initiated at the switch itself or by a system-level control. Regardless of the impetus for the reduction in power, the effect is to increase the potential for an oversubscription condition on that switch. With the principles of the present invention, the risk of packet loss due to the artificially-created oversubscription condition is reduced.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A switch, comprising:
   a plurality of ingress ports in an input/output section of the switch, said plurality of ingress ports receiving traffic from a corresponding plurality of network devices that are coupled to said plurality of ingress ports via a respective plurality of network communication cables; and
   a packet rate control module in a processing core section of the switch, said packet rate control module determining whether a combined arrival rate of traffic received on said plurality of ingress ports in said input/output section of the switch exceeds a packet processing rate of said processing core section of the switch in routing said traffic received on said plurality of ingress ports to a plurality of egress ports in said input/output section of the switch, said packet rate control module initiating a delivery of packet rate control messages to said plurality of network devices via said network communication cables upon a determination that said combined arrival rate of traffic received on said plurality of ingress ports in said input/output section of the switch exceeds said packet processing rate of said processing core section of the switch, said packet rate control messages instructing said plurality of network devices to reduce a delivery rate of traffic to said plurality of ingress ports.

2. The switch of claim 1, wherein said packet rate control messages include a packet rate limit that is determined by dividing said packet processing rate of said processing core section of the switch by a number of said plurality of ingress ports.

3. The switch of claim 1, wherein a packet rate control message includes a packet rate limit that is determined by identifying a share of said packet processing rate of said processing core section of the switch that is attributed to a particular network device.

4. The switch of claim 1, wherein a packet rate control message includes a time duration for said reduction in said delivery rate.

5. The switch of claim 1, wherein said determination is based on a buffer fill level in said processing core section of the switch.

6. The switch of claim 1, wherein said determination is based on a ratio of said combined arrival rate to said packet processing rate of said processing core section of the switch.

7. The switch of claim 1, wherein said combined arrival rate of traffic on said plurality of ingress ports represents a sum of the arrival rate of traffic on all of said plurality of ingress ports.

8. A system for rate control in a network, comprising:
   a switch having an input/output section that includes a plurality of ingress ports and a plurality of egress ports, wherein the plurality of ingress ports in said input/output section are configure to receive traffic from a corresponding plurality of network devices in said network via a respect plurality of network communication cables, said switch further including a processing core section that is configured to route traffic received on said plurality of ingress ports in said input/output section of said switch to a plurality of egress ports in said input/output section of said switch; and
   a control station that is separate from said switch and that is coupled to said plurality of network devices, said control station transmitting instructions to said plurality of network devices to reduce a packet transmission rate to said plurality of ingress ports of said input/output section of said switch, said instructions being transmitted by said control station in response to one or more measured performance metrics that includes a determination of whether a combined arrival rate of said traffic received on said plurality of ingress ports in said input/output section of said switch exceeds a packet processing rate of said processing core section of said switch.

9. The system of claim 8, wherein said transmitted instructions include a packet rate control message.

10. The system of claim 9, wherein said packet rate control message specifies a packet rate limit.

11. The system of claim 9, wherein said packet rate control message specifies a time duration for said reduction in said packet transmission rate.

12. The system of claim 9, wherein one of said one or more measured performance metrics is a temperature measurement.

13. The system of claim 9, wherein one of said one or more measured performance metrics is a power measurement.

14. The system of claim 9, wherein one of said one or more measured performance metrics is a time of day measurement.

* * * * *